United States Patent
Becker et al.

[11] 3,910,677
[45] Oct. 7, 1975

[54] HYPERBOLIC TYPE OPTICAL FIBER LENS COUPLER FOR COUPLING THE FIBER TO AN OPTICAL LINE SOURCE

[75] Inventors: Edward Eugene Becker, High Bridge; Kaneyuki Kurokawa, Murray Hill, both of N.J.

[73] Assignee: Bell Telephone Laboratories, Incorporated, Murray Hill, N.J.

[22] Filed: May 13, 1974

[21] Appl. No.: 469,064

[52] U.S. Cl. .......................... 350/96 C; 350/96 WG
[51] Int. Cl.² ............................................. G02B 5/14
[58] Field of Search .......... 350/96 C, 96 WG, 96 R; 250/227

[56] References Cited
UNITED STATES PATENTS
2,740,318   3/1956   Sharp ................................ 350/96 R OTHER PUBLICATIONS
Kato, "Journal of Applied Physics," June 1973, pp. 2756–2758.

Primary Examiner—R. V. Rolinec
Assistant Examiner—Darwin R. Hostetter
Attorney, Agent, or Firm—D. I. Caplan

[57] ABSTRACT

The angular profiles of optical radiation emitted by certain conventional optical sources, such as a semiconductor P-N junction laser, are similar to those of optical line sources. In order to increase the optical coupling efficiency from such optical line sources to an optical fiber, the input end of the fiber is shaped essentially into the form of a hyperbolic cylindrical lens by first forming a flat wedge at this end of the fiber and then finishing the wedge to the desired essentially hyperbolic cylindrical surface. This finishing can be accomplished by either a flame (heat) type polishing or a mechanical (fine abrasive) type polishing.

6 Claims, 4 Drawing Figures

U.S. Patent  Oct. 7, 1975  3,910,677
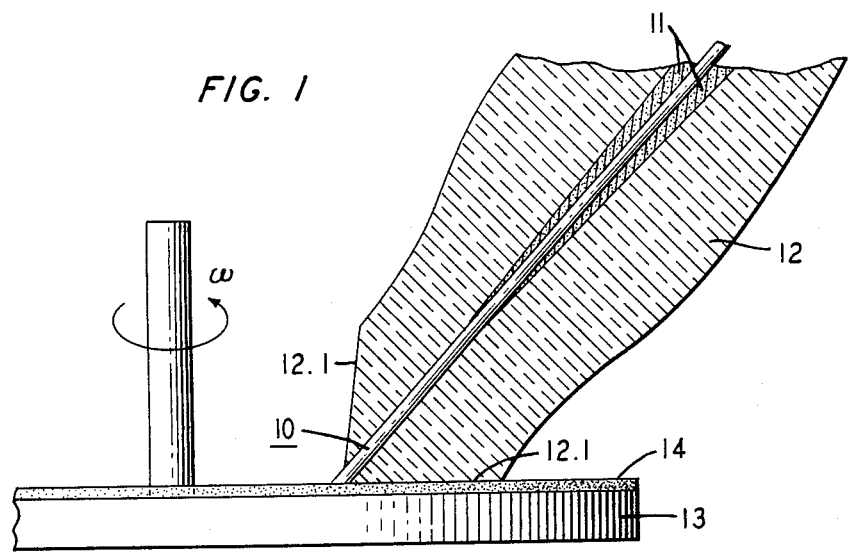
FIG. 1
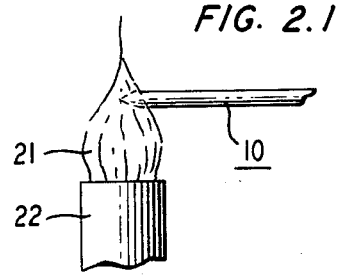
FIG. 2.1
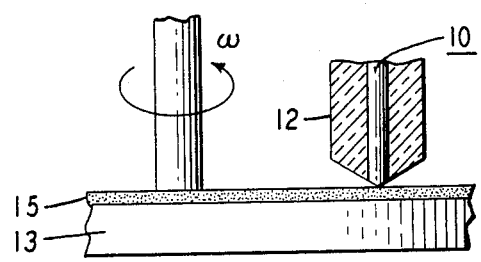
FIG. 2.2
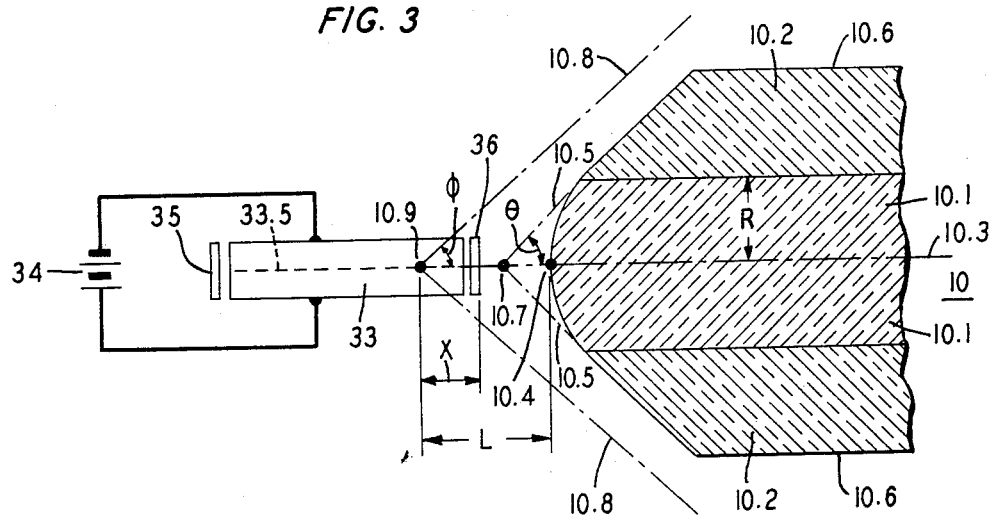
FIG. 3

HYPERBOLIC TYPE OPTICAL FIBER LENS COUPLER FOR COUPLING THE FIBER TO AN OPTICAL LINE SOURCE

FIELD OF THE INVENTION

This invention relates to the field of optical fiber communication systems, and more particularly to optical fiber couplers.

BACKGROUND OF THE INVENTION

One of the problems in optical fiber communication systems arises from the optical radiation losses associated with the coupling of radiation from an optical source into the optical fiber. In the prior art, substantial improvements in the coupling efficiency have been obtained in the case of a multimode glass fiber, by means of a spherical lens melted onto the input end (port) of the fiber. This spherical lens thereby improves the fraction of power emanating from the optical source which is coupled into the fiber for useful transmission therethrough. However, there are several disadvantages encountered when the spherical lens-shaped input port is used for coupling to an optical line source as, for example, a semiconductor junction laser. First, since the radius of the central core of a cladded fiber is ordinarily small compared with the outer radius of the cladding (and hence with the radius of curvature of the lens), the improvement in optical coupling efficiency is somewhat limited. Second, the spherical lens itself tends to excite the propagation of unduly high order modes (due to spherical aberrations), which propagate at undesirably slow speeds and with high losses in the fiber. Third, the spherical lens is still less effective in reducing optical coupling losses in the case of fibers having a radially graded index of refraction.

It is known in the prior art that a lens system can be designed which yields almost any desired type of optical image from a given object, provided no upper limit is imposed upon fabrication complexity or cost. It would therefore be desirable to have a relatively simple and cheap means for reducing optical coupling losses associated with optical fibers.

SUMMARY OF THE INVENTION

In order to reduce the optical radiation losses, arising when coupling the radiation from an optical source into a cladded optical fiber having a core region for propagating optical radiation, the surface of the input end (port) of the fiber is shaped into the form of essentially a hyperbola, that is, a surface whose radius of curvature is less at the central (axial) region of the fiber than at the peripheral region of the fiber. In this way, radiation losses are reduced in the coupling of radiation from an optical source into the fiber such that the radiation propagates in useful modes through the fiber. More specifically, when using an optical line source such as provided by a semiconductor junction injection laser, the input end surface of the fiber is formed into essentially a cylindrical hyperbolic surface characterized by a cylinder axis which is parallel to the line type optical source formed by the junction laser. Again, the radius of curvature of this end surface of the fiber is a minimum at the central (axial) region of the fiber. Thereby, optical losses associated with coupling from source into fiber are reduced by reason of the known principle that a hyperbolic surface can be aberration-free for a point image (or object) with an object (or image) at infinity. See: H. H. Emsley, Aberration of Thin Lenses, p. 30 (Constable and Co. Ltd., London, 1956). Such a hyperbolic surface should have its asymptotes intersect at a half-angle $\phi$ satisfying: $\cos \phi = 1/N$, where N is the ratio of the respective refractive indices of the media on both sides of the surface.

In a specific embodiment of the invention wherein an optical line source is used, such as a P-N junction gallium arsenide semiconductor injection laser, the input end of a cladded optical fiber is first shaped into a flat wedge formed by a pair of flat surfaces. Advantageously, the two surfaces of this wedge are symmetrical planar surfaces making the same angle $\theta$ with respect to the longitudinal central axis of the fiber. This wedge can be formed by mechanically grinding (lapping) the end of the fiber against an abrasive surface for example. Then the fiber is polished into final form of a hyperbolic cylinder, the axis of this cylinder being parallel to the original line of intersection of the two surfaces of the wedge. This polishing can be carried out either by heating the end of the fiber, in a flame for example, or alternatively by further mechanical lapping with a fine abrasive. Thereby an essentially hyperbolic cylindrical optical lens type of surface is formed characterized by a smaller minimum radius of curvature (larger maximum curvature) at the central axis of the fiber core than at its periphery, said minimum radius (maximum curvature) being measured as a minimum with respect to rotations of an imaginary plane in which the radius of curvature is measured. Thus, the maximum curvature is an absolute maximum at the central axis and monotonically tapers to a minimum at the periphery of the core region of the fiber (and to still lower values of curvature in the region of cladding).

Advantageously, the previously formed flat wedge half-angle $\theta$ is selected such that the asymptotes to the substantially hyperbolic cylindrical lens (formed by the subsequent polishing of the flat wedge) intersect at a half-angle $\phi$ which satisfies $$\cos \phi = 1/N$$

where N is the refractive index of the fiber core with respect to the medium which will surround the input end surface of the fiber during utilization, typically air. Such a fiber is then useful for propagating optical radiation supplied by the P-N junction laser aligned so that its P-N junction plane is parallel to the axis of the (hyperbolic) cylinder surface at the input end of the fiber. For minimizing the optical laser-fiber coupling losses, the fiber is located at a distance from the output end of the junction laser cavity such that this end of the laser cavity lies on, or close to, the focal plane of the hyperbolic cylinder end surface of the fiber.

BRIEF DESCRIPTION OF THE DRAWING

This invention, together with its features, advantages and objects, can be better understood from the following detailed description when read in conjunction with the drawing in which:

FIG. 1 illustrates an early step of a process for providing an optical fiber with a substantially hyperbolic cylinder type optical coupling surface, in accordance with a specific embodiment of the invention;

FIG. 2.1 illustrates a subsequent flame polishing step in a process for providing an optical fiber with a substantially hyperbolic cylinder type optical coupling surface, in accordance with a specific embodiment of the invention;

FIG. 2.2 illustrates a subsequent mechanical polishing step in the process for providing an optical fiber with a substantially hyperbolic cylinder type optical coupling surface, in accordance with an alternate specific embodiment of the invention; and FIG. 3 shows an arrangement for utilization of an optical fiber provided with a substantially hyperbolic cylinder optical coupling surface in accordance with this invention, in conjunction with a semiconductor junction laser source.

For the sake of clarity only, none of the drawings is to any scale.

DETAILED DESCRIPTION

In order to provide a holder 12, useful for holding a thin fragile quartz glass fiber 10 during the grinding and polishing steps of this invention, a commercially available quartz capillary tube, with an outside diameter of about 4 to 6 millimeters and an inside bore diameter of about 0.2 to 0.5 millimeters, is "necked" (drawn) down at an elevated temperature so that an end portion thereof has an outside diameter of about 0.6 millimeters. This necked-down portion is then cut to a flat edge, perpendicular to the axis of the tube, in a region where the inside diameter (I.D.) is about 150 microns for the case where the glass fiber 10 to be processed has an outside diameter (O.D.) of about 125 microns. This flat edge of the capillary tube is then lapped and polished into a flat wedge formed by a pair of symmetrical planar surfaces 12.1. These surfaces 12.1 thereby form a wedge at the end of the capillary tube having the same slant angle $\theta$ as the wedge surfaces ultimately to be introduced at the optical input end of the fiber 10.

In order to form the surfaces 12.1, the capillary tube 12 is first roughly ground into the ultimately desired wedge, using for example a horizontally mounted Norton abrasive wheel, such as C 120 JRA Carborundum, typically mounted on a Buehler metallurgical lapping wheel machine 13 which is rotated as indicated by the curved arrow $\omega$. The grinding angle, suitable for making the desired slant angle $\theta$ of the pair of surfaces 12.1, is set by mounting the capillary tube in an aluminum fixture with a movable block (not shown) to control the angular setting adjustment. After the coarse grinding with abrasive, the two slant flat surfaces forming the wedge at the end of the capillary tube 12 are then polished using typically the following abrasives in successive order:

1. grade 0 emery polishing paper wet,
2. grade 4/0 emery polishing paper wet, and
3. 3 microns aluminum oxide imbedded in a wet Politex Supreme P.S. lapping disc. This completes the preparation of the holder 12 as shown in FIG. 1 (with the glass fiber tube 10 already inserted inside of it).

In order to prepare the glass tube 10 for insertion into the holder 12, the fiber (typically a cladded quartz glass solid circular cylinder) is first cleaved flat at least at one of its ends, by means of conventional nicking and bending under tension. The cleaved fiber is inserted into the tube 12 and cemented in place with quartz cement 11, leaving about 40 microns length of fiber protruding outside of the previously wedge-shaped end formed by surfaces 12.1. The fiber 10 is then ground down at the desired wedge angle $\theta$, for example using the aluminum block fixture (not shown) to hold the holder 12 in place at this desired angle against a lapping wheel machine 13 upon which is secured a polishing layer 14 of 4/0 emery. By carefully grinding the fiber 10 against the emery layer 14, excess fiber protruding from the holder 12 is removed, and thereby one of the pair of flat slanting surfaces 12.1 is thereby roughly formed. The holder 12 (with the fiber 10 still cemented thereto) is withdrawn from the lapping wheel and is rotated 180° about its own axis. Again the protruding end of the fiber 10 in the holder 12 is ground against the emery layer 14, so that now this end of the fiber has the shape of a pair of symmetrical slanting flat planes forming a flat wedge surface. However, this flat wedge surface, at this stage of the processing, is not of smooth optical quality (and also has a sharp tip formed by the intersection of the plane surfaces of the wedge); therefore, the wedge surface must be further smoothed and polished to optical quality. This can be accomplished either by flame polishing (FIG. 2.1) or by further mechanical polishing (FIG. 2.2).

As is indicated in FIG. 2.1, in order to flame polish the end of the fiber 10, the wedge end of the fiber is quickly melted into the form of a cylindrical lens. In order to do this, the fiber 10 is first removed from the holder 12 by softening the quartz cement with heat. The fiber 10 is then quickly (1 or 2 seconds) passed through a flame 21 provided by a torch 22, for example a Micro-Flame Torch Model No. 1,000 operated with a mixture of natural gas and oxygen. The core of the flame is adjusted typically to a length of about 3 millimeters and the fiber end is then passed quickly through the leading edge of the core of the flame. For proper smoothing out of the end of the quartz fiber, the fiber end should be brought just above a red glow, so that the whole procedure of flame polishing takes only a few seconds. Thereby, the polished end of the fiber takes on the appearance as shown in FIG. 3, whereby the fiber 10, including a central core region 10.1 and a conventional cladding 10.2 with a peripheral circularly cylindrical surface 10.6 of the cladding 10.2, has an optically smooth and substantially hyperbolic cylindrical surface in the neighborhood of (imaginary) vertex line 10.4 (perpendicular to plane of drawing). This surface is now optically smoothed, so that the curvature of the finished end surface in the neighborhood of the center line 10.3 of the fiber is larger (radius of curvature is smaller) at the paraxial regions of the fiber than at peripheral regions (more remote from the vertex line 10.4 going toward the peripheral surface 10.6 of the cladding 10.2). More specifically, the curvature is a maximum at the central axis 10.3 and monotonically decreases to a minimum at the periphery of the fiber where the end surface intersects the peripheral circularly cylindrical surface 10.6 of the cladding 10.2.

As shown in FIG. 2.2, instead of the flame polishing procedure just described, the end tip of the fiber 10 may be alternatively optically polished simply by a further mechanical polishing step, as indicated in FIG. 2.2. In this mechanical polishing step, the fiber 10 in the holder 12 is polished by bringing the fiber normally up against a politex lapping disc 15 in which is suspended a 3-micron aluminum abrasive in water. The disc 15 is mounted horizontally on the lapping wheel 13. In this way the end of the fiber 10 similarly takes on the form, as shown in FIG. 3, of an optically smooth substantially hyperbolic cylindrical surface. Thereby, the end surface of the fiber is now of optical quality, and the finished fiber is then removed from the capillary tube 12 by softening the quartz cement with the application of heat.

Subsequent to either the above-described flame polishing (FIG. 2.1) or mechanical polishing (FIG. 2.2), the fiber is then cleaned of cement and any other foreign materials, by placing the fiber in a solution of warm acetone and agitating the solution. Finally, the fiber is blown dry and is now ready for use as indicated in FIG. 3.

As shown in FIG. 3, the fiber 10 (magnified in comparison with FIGS. 1 and 2.1 or 2.2) has a core 10.1 of a radius R and a uniform refractive index N for the optical radiation to be propagated. By reason of the previous processing steps (FIGS. 1 and 2.1 or 2.2), the optical input end of the fiber has the maximum curvature (minimum radius of curvature) at the vertex 10.4. Indeed, as characteristic of a hyperbolic curve, most (if not substantially all) of the surface of the cladded portion will be substantially flat. The tangents 10.5 to the periphery of the core (where the core meets the cladding) mutually intersect at the half-angle $\theta$ at point 10.7, located in front of the vertex 10.4 of the fiber. The dotted lines 10.8 are substantially the asymptotes of the substantial hyperbolic cylindner formed at the end of the fiber by the above polishing procedure. These lines 10.8 mutually intersect at the half-angle $\phi$ at point 10.9, more remote from the vertex 10.4 than point 10.7 where the tangents 10.5 intersect. Advantageously, this half-angle $\phi$ satisfies the above equation.

FIG. 3 further illustrates the use of the fiber, fabricated as described above, for the purpose of propagating optical radiation supplied by a semiconductor laser source 33. This laser source has a P-N junction 33.5 where optical radiation is generated by reason of laser action energized by a battery 34. A laser cavity is formed by this junction 33.5 in conjunction with a pair of mirrors 35 and 36. Advantageously, the center of the (laser output) mirror 36 is located substantially at the intersection 10.9 of the asymptotes 10.8, that is, substantially at the focal point of the hyperbolic end surface of the fiber 10. However, at some sacrifice of single-mode propagation and dispersion into other modes, but at the simultaneous gain of overall coupling efficiency, this mirror 36 can be located a distance $x$ from point 10.9, closer to the vertex 10.4. Typically, $x$ can be in the range from about 0 to 0.5L, where L is the distance from point 10.9 to 10.4, i.e., the focal length of the hyperbolic surface. In addition, advantageously, for a fiber core diameter 2R, the laseractive region of the junction 33.5 should extend no more than this distance 2R in the direction perpendicular to the plane of the drawing, in order not to produce radiation which cannot be coupled into the fiber core at all. As known in the art, the mirrors 35 and/or 36 need not be physically separate elements, but can be formed by the cleaved end surfaces of the semiconductor body containing the junction 33.5.

It is also advantageous that the fiber core radius, R, be selected such that R is in the range of approximately 0.1L to 2L, and preferably R is equal to L within a factor of approximately two. In this way, the coupling of optical radiation from the source into the fiber, in the form of useful propagating modes therein, is achieved at greater efficiency (lower loss) than can be obtained by coupling with a spherical or flat end fiber.

While this invention has been described in detail in terms of specific embodiments, various modifications can be made without departing from the scope of this invention. For example, in the case of an optical point (rather than line) source, the input end of the fiber should be made into a hyperboloid of revolution (i.e., one of a two-sheet hyerboloid) by first grinding down the originally flat end of the fiber into the shape of a right circular cone, and then rounding off the apex of the cone by polishing (flame or mechanical). Also, other types of optical fiber materials, such as fused silica, can be used for the fiber 10. Finally, instead of a cladded fiber (step function type of radial refractive index profile), radially graded index (uncladded) fibers can also be used. In such cases of radial gradient of refractive index fibers, the value of refractive index N to be used in the above equation for $\cos \phi$ can simply be an average value taken over the (central) entrance (input) port surface of the fiber. The precise kind of averaging procedure for N is ordinarily of no significance, because of the ordinarily small net variation of N (1 percent to 2 percent) over the central region of the fiber in practical applications.

What is claimed is:

1. An optical fiber having a core region for propagating optical radiation and having an end surface whose intersection with a measuring (imaginary) plane surface containing a central axis of the fiber is chararcterized by a larger paraxial maximium curvature (smaller paraxial radius of curvature) than peripheral maximum curvature, the said maximum (with respect to rotations of the measuring plane) curvature at the central axis of the fiber being an absolute maximum and the said curvature monotonically tapering off to a minimum at the periphery of the core region of the fiber, such that the end surface is substantially in the form of a hyperbola in said plane surface, so that the end surface can couple optical radiation from an optical source into the fiber for propagation therethrough.

2. An optical fiber according to claim 1 in which the end surface is substantially in the form of a hyperbolic cylinder.

3. The fiber of claim 1 in which the fiber includes a central core portion and a peripheral cladding portion, said fiber being located with respect to the output end of a laser cavity such that this output end of the laser cavity is located substantially on the focal plane of the hyperbola.

4. The fiber of claim 2 in which the fiber is a solid circular cylinder.

5. The fiber of claim 2 in which the fiber has a radial gradient of refractive index.

6. An optical fiber according to claim 1 in which the end surface is substantially in the form of one sheet of a hyperboloid of revolution of two sheets.

* * * * *